Aug. 3, 1948. A. E. DODD 2,446,216
ELECTRICAL CONTROL APPARATUS
Original Filed July 16, 1945
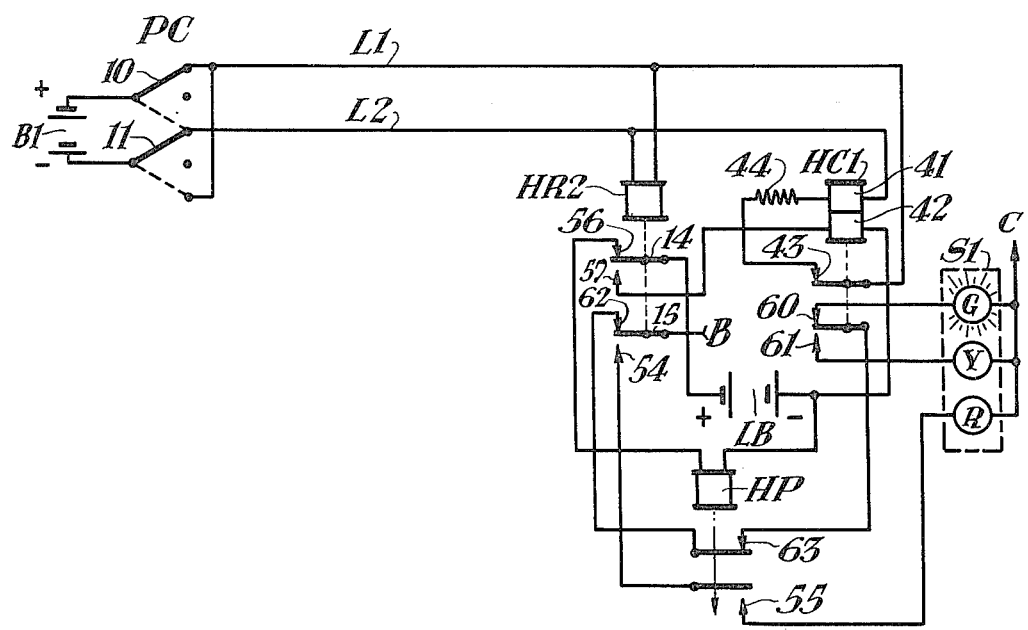
INVENTOR.
Arthur E. Dodd.
BY
HIS ATTORNEY Patented Aug. 3, 1948

2,446,216

UNITED STATES PATENT OFFICE 2,446,216

ELECTRICAL CONTROL APPARATUS

Arthur E. Dodd, Edgewood, Pa., assignor to The Union Switch & Signal Company, Swissvale, Pa., a corporation of Pennsylvania Original application July 16, 1945, Serial No. 605,400, now Patent No. 2,436,293, dated February 17, 1948. Divided and this application June 19, 1947, Serial No. 755,671

3 Claims. (Cl. 177—353)

My invention relates to electrical control apparatus, and more particularly to apparatus to effect either a first or a second control function according as a control circuit is supplied with current of positive or negative polarity.

The present application is a division of my copending application for Letters Patent of the United States, Serial No. 605,400, filed July 16, 1945, for Electrical control apparatus, now U. S. Patent 2,436,293, dated February 17, 1948.

A feature of my invention is the provision of electrical control apparatus incorporating novel means to assure a first control function in response to current of normal polarity and a second control function in response to current of reverse polarity, and to effect the second function in the event the apparatus fails to properly respond to current of normal polarity.

Another feature of my invention is the provision of improved electrical control apparatus for obtaining a polar control by the use of neutral relays.

Other features, objects and advantages of my invention will appear as the specification progresses.

The foregoing features, objects and advantages of my invention are attained by the provision of two direct current neutral relays and a novel circuit arrangement for energizing the relays from a control circuit which at times is deenergized and to which circuit at other times current is supplied of either positive or negative polarity. For example, the control circuit may be a line circuit of a railway signal system, a battery being connected to one end of the line circuit through contacts of a pole changer type of controller and signal control relays being connected to the other end of the control circuit.

A first one of the relays of the control apparatus here provided is preferably a direct current neutral relay, the armature of which is biased by its own weight to a first or released position when the relay is deenergized and is attracted to a second or picked up position when the relay is energized at either polarity. This first or main relay is connected to the control circuit to be energized and picked up when the current of either polarity is supplied to the circuit and to become deenergized and released when the circuit is deenergized.

A second one of the control relays of the control apparatus is preferably a two winding direct current neutral relay which is provided with a pick-up and a stick circuit. The pick-up circuit includes one winding of the relay, a back contact of the first relay and a current source local to the location of the control apparatus. That is, this local source is ordinarily independent of the current source of the control circuit. The local source is poled for the pick-up circuit to energize the second relay at a preselected polarity, which by way of illustration I shall assume in the following description to be of positive polarity. The stick circuit for the second relay connects a second winding of the relay to the control circuit for energizing the second relay by the control circuit current subsequent to the energization of the first relay to disconnect the local current source. The connection of the stick circuit to the control circuit is such that the second relay is energized at its preselected positive polarity if the control circuit is supplied with current of positive polarity but not when the control circuit is supplied with current of negative polarity. In this way the energization of the second relay is reversed when the control circuit is supplied with current of negative polarity and such reversal causes the relay to be released as the energization of the relay tends to pass through zero. The second relay once thus released remains deenergized due to the opening of its front contact interposed in its stick circuit until the first relay is released to reclose the pick-up circuit. The second relay jointly with the first relay is used to control signal circuits and consequently a first control of such signal circuits can be effected when current of positive polarity is supplied to the control circuit and the second relay is picked up and a second control of the signal circuits can be effected when the control circuit is supplied with current of negative polarity and the second relay is released.

I shall describe one form of apparatus embodying my invention, and shall then point out the novel features thereof in claims.

The accompanying drawing is a diagrammatic view showing a preferred form of apparatus embodying my invention when used to control a railway signal.

It is to be understood that the invention is not limited to the control of a railway signal and this one use serves to illustrate the many places the apparatus is useful.

Referring to the drawing, the reference characters L1 and L2 designate the two conductors of a control circuit here shown in the form of a line circuit for a railway signal system, and which circuit extends between two signal locations along the railway. At a first location this line circuit is connected to a source of direct current, such as a battery B1, through contact members 10 and 11 of a pole changer type of controller PC. The arrangement is such that direct current of what I shall call positive polarity is supplied from battery B1 to the line circuit when the controller PC is moved to a first extreme position where its contact members 10 and 11 occupy the position shown by the solid lines in the drawing, and current of negative polarity is supplied to the line circuit when the controller is set at a second extreme position and contact members 10 and 11 occupy the position shown by dotted lines. Furthermore, the controller PC is preferably operable to a mid position where the battery B1 is disconnected and the line circuit is deenergized.

At the second location the line circuit is connected to control apparatus which includes a first or main relay HR2 and a second or auxiliary relay HC1. The main relay HR2 is a direct current neutral relay having a winding connected to conductors L1 and L2 of the line circuit. Consequently, the relay HR2 is energized to pick up a neutral armature to which contact members 14 and 15 are attached to close front contacts 56 and 62, respectively, when the line circuit is supplied with current of either polarity and this armature is released to close back contacts 54 and 57 when the line circuit is deenergized.

The auxiliary relay HC1 is a two winding direct current neutral relay and is provided with a pick-up and a stick circuit. The pick-up circuit is supplied with current from a battery LB which is preferably placed at the same location as the control relays. This pick-up circuit can be traced from positive terminal of battery LB through back contact 57 of relay HR2, a first winding 42 of relay HC1 and to negative terminal of battery LB. The battery LB is poled for relay HC1 to be energized at a preselected polarity by the pick-up circuit, and I shall assume that relay HC1 is energized at positive polarity when connected to the battery LB. Relay HC1 is also provided with a stick circuit for connecting a second winding 41 of the relay to the line circuit for energizing the relay by the line circuit current. One side of such stick circuit can be traced from the left-hand terminal of winding 41 of relay HC1 through a resistor 44 and front contact 43 of the relay to conductor L1, and the other side of the stick circuit extends from the righthand terminal of winding 41 to line conductor L2.

The connections of the stick circuit of relay HC1 are such that the relay is energized at positive polarity when the line circuit is supplied with current of positive polarity and the relay HC1 is energized at negative polarity when the line circuit is supplied with current of negative polarity. Thus, line circuit current of positive polarity energizes the relay HC1 at the same polarity as the relay is energized by the local battery LB through the pick-up circuit. Consequently, with relay HC1 energized by its pick-up circuit, the relay HC1 is retained picked up by the line circuit current subsequent to the line circuit being supplied with current of positive polarity and the first relay HR2 picked up, the relay HC1 being provided with slow release characteristics to retain the relay picked up during the transfer period of the contacts of relay HR2. However, the energization of relay HC1 is reversed subsequent to the picking up of relay HR2 when current of negative polarity is supplied to the line circuit, and such reversal of the energization of relay HC1 causes the relay to be released as its energization tends to pass through zero. With relay HC1 once released opening its stick front contact 43 the relay remains released until relay HR2 is released to reclose the pick-up circuit. In other words, relay HC1 is retained picked up in response to line circuit current of positive polarity and is held released in response to line circuit current of negative polarity.

The apparatus also includes a slow release repeater relay HP for the relay HR2 and which repeater relay is energized through an obvious circuit including front contact 56 of relay HR2.

The control relays jointly control a railway signal S1, here shown in the form of a color light signal.

In describing the operation of the apparatus I shall first assume that the line circuit is deenergized due to the controller PC being set at its mid position to disconnect battery B1. With the line circuit deenergized the main relay HR2 and in turn its repeater relay HP are deenergized, and with relays HR2 and HP released closing back contacts 54 and 55, respectively, a signal circuit is completed for a lamp R of the signal S1 and current is supplied from a suitable source the terminals of which are designated B and C, to the lamp R to illuminate the lamp for the signal to display a stop signal indication.

I shall next assume that the controller PC is set at its first extreme position where the contact members 10 and 11 occupy the full line position and current of positive polarity is supplied to the line circuit. The main relay HR2 is now energized to pick up its neutral armature. With relay HR2 picked up, the auxiliary relay HC1 is switched from battery LB to the line circuit and the relay HC1 is retained picked up by the line circuit current because the line circuit current now energizes the relay HC1 at the same polarity as the relay is energized by battery LB through the pick-up circuit. The relay HP is also picked up due to the picking up of the main relay HR2. Under this condition of the control relays a signal circuit extends from terminal B through front contact 62 of relay HR2, front contact 63 of relay HP, front contact 60 of relay HC1 and lamp G of signal S1 to terminal C, and the lamp G is illuminated for signal S1 to display a clear signal indication. That is to say, the signal S1 displays a clear signal indication in response to line circuit current of positive polarity.

In the event the controller PC is moved to its second extreme position, that is, to the dotted line position, and current of negative polarity is supplied to the line circuit, the relay HR2 is energized to pick up its neutral armature the same as before.

The energization of the stick or holding winding 41 of relay HC1 is now of negative polarity and reverse to the energization of the pick-up winding 42 by battery LB. Such reversal of the energization of relay HC1 causes the relay to release as the energization tends to pass through zero. With relay HC1 once released it then remains released due to the opening of front contact 43. A signal circuit is now formed from terminal B through front contact 62 of relay HR2, front contact 63 of relay HP, back contact 61 of relay HC1 and lamp Y to terminal C, and that lamp is illuminated for signal S1 to display an approach signal indication in response to line circuit current of negative polarity.

Apparatus such as here disclosed has the advantages that a first function is effected in response to current of one polarity and a second function is effected in response to current of the opposite polarity with the use of neutral relays.

lso, the apparatus is comparatively simple and inexpensive and can be applied to present systems to provide polar control.

Although I have herein shown and described but one form of electrical control apparatus embodying my invention, it is understood that various changes and modifications may be made herein within the scope of the appended claims without departing from the spirit and scope of my invention.

Having thus described my invention, what I claim is:

1. In combination, a control circuit supplied with direct current of normal or reverse polarity according as a controller is set at a first or a second position, a first neutral relay connected to said control circuit to be energized by the control circuit current, a second neutral relay, a pick-up circuit including a current source independent of the first mentioned current source and a back contact of said first relay connected to a winding of said second relay to energize the second relay at a preselected polarity, a stick circuit including a front contact of the second relay to connect a winding of the second relay to said control circuit and disposed to energize the second relay at said preselected polarity only when the control circuit current is of normal polarity whereby said second relay is picked up or is released according as the control circuit current is of normal or reverse polarity, a first signal circuit including a front contact of each of said relays, and a second signal circuit including a front contact of said first relay and a back contact of said second relay.

2. In combination, a line circuit extending between two locations, a current source at a first one of said locations connected to said line circuit through contacts of a pole changer to supply direct current of normal or reverse polarity according to the position of the pole changer, a first and a second neutral relay at a second one of said locations, said first relay having a winding connected to said line circuit to energize the relay by said current irrespective of its polarity, said second relay having a pick-up winding connected to a direct current source local to said second location through a back contact of said first relay and a holding winding connected to said line circuit through a front contact of the second relay, said local source poled to energize the second relay at a preselected polarity, said holding winding connected to energize the second relay at said preselected polarity only when the line circuit current is of normal polarity to retain the second relay picked up in response to line circuit current of normal polarity and to release the second relay in response to line circuit current of reverse polarity, and signal circuits selectively controlled by said relays jointly.

3. In combination, a line circuit extending between two locations, a current source at a first one of said locations connected to said line circuit through contacts of a pole changer to supply direct current of normal or reverse polarity according to the position of the pole changer, a first, a second and a third neutral relay at a second one of said locations, said first relay connected to said line circuit to be energized and picked up by said line circuit current of either polarity, said second relay having a pick-up winding connected to a direct current source at said second location through a back contact of the first relay and a holding winding connected to the line circuit through a front contact of the second relay, said pick-up winding disposed to energize the second relay at a preselected polarity and said holding winding disposed to energize the second relay at said preselected polarity only when the line circuit current is of positive polarity, said third relay connected to said second location current source through a front contact of the first relay, a first signal circuit including in series a front contact of each of said three relays, a second signal circuit including in series a front contact of each of said first and third relays and a back contact of said second relay, and a third signal circuit including in series a back contact of each of said first and third relays.

ARTHUR E. DODD.